United States Patent

[11] 3,589,480

[72] Inventors Lars B. Axelsson;
Kaj A. Lilja; Sten-Eric Svensson, all of Malmo, Sweden
[21] Appl. No. 860,613
[22] Filed Sept. 24, 1969
[45] Patented June 29, 1971
[73] Assignee Svenska Aktiebolaget Bromsregulator
Malmo, Sweden
[32] Priority Sept. 27, 1968
[33] Great Britain
[31] 45,900/68

[54] RAILWAY DISC BRAKE
10 Claims, 5 Drawing Figs.
[52] U.S. Cl. .................................................. 188/203 S,
92/114, 188/59, 188/196 PRR
[51] Int. Cl. ........................................................ F16d 65/66
[50] Field of Search............................................... 188/59,
196, 198—203 S; 92/13, 114

[56] References Cited
UNITED STATES PATENTS
1,755,305  4/1930  Osborn.................188/196 (RR) UX
2,096,463  10/1937  Moody..................... 188/196 (RR)
3,189,128  6/1965  Herbert........................ 188/59

Primary Examiner—Duane A. Reger
Attorney—Laurence R. Brown

ABSTRACT: Automatic brake adjusting means for disc brakes, on opposite sides of a railway wheel is disclosed, having two telescopically adjustable piston rod parts taking up slack in the rigging. A spring-biased braking force threshold means operates a clutch to permit rotation of a sleeve having a spiral groove during braking. Upon release of braking the sleeve in a return motion serves to telescopically adjust the piston rod parts, as afforded by operation of a one-way clutch.

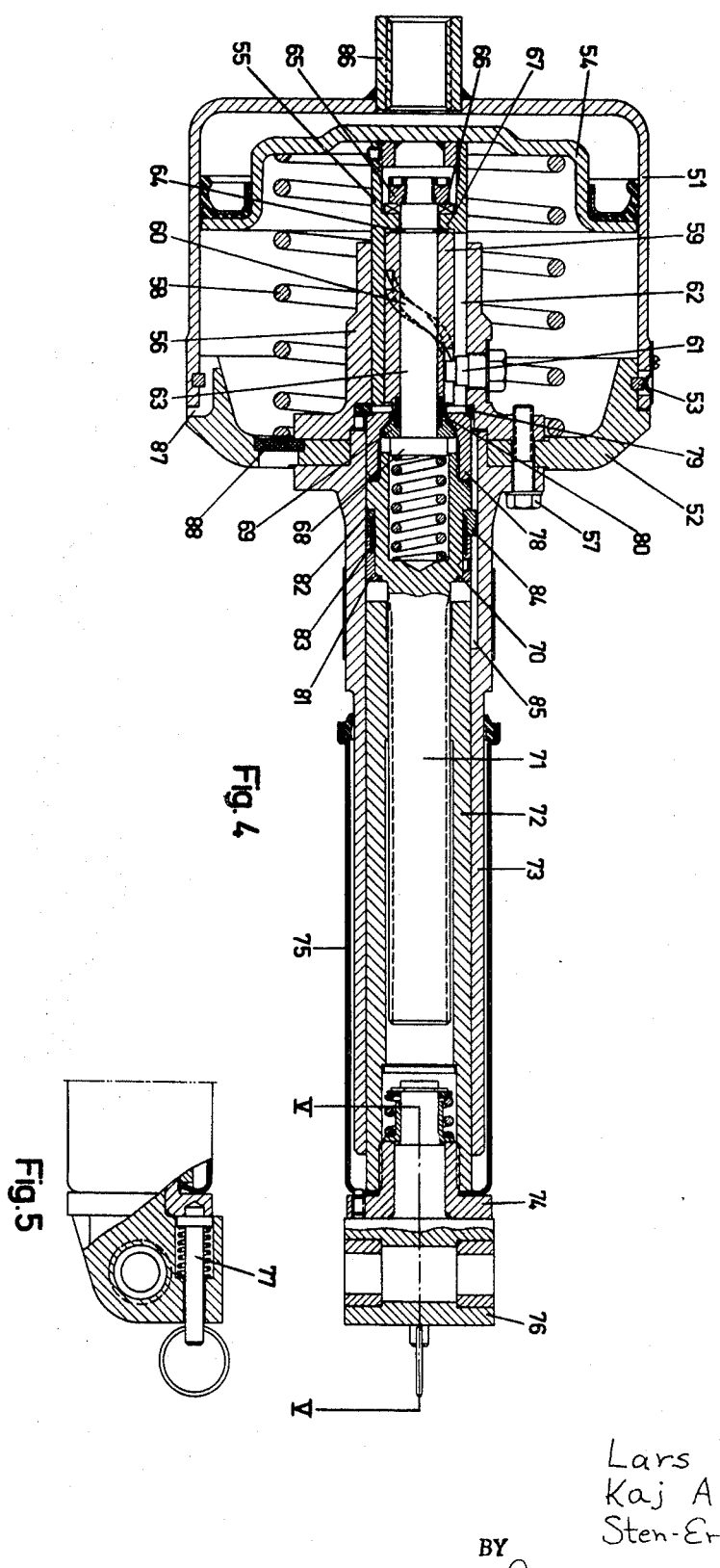

RAILWAY DISC BRAKE

This invention relates to a railway vehicle disc brake of the kind activated by a pneumatic cylinder piston unit.

In the known railway vehicle disc brakes it has been proposed to provide means for manually adjusting the length of the brake force transmission when the braking surfaces have been worn to such degree that the brake efficiency has decreased below a certain limit. It has also been proposed to provide means performing such adjustments automatically, but the known systems have either been of such great length that they may be difficult to mount or they have been of designs having insufficient accuracy.

The object of the present invention is to provide a railway vehicle disc brake in which a uniform braking effect is obtained. Furthermore the full braking pressure in the cylinder and the pressure between the pads and the discs of such a brake should be obtained after a piston stroke the length and position of which is independent of the wear of the braking surfaces. A further object is to obtain a disc brake of compact and reliable design.

These and other objects will be obtained by a disc brake of the above kind which according to the invention is characterized in that the piston rod comprises two telescopically displaceable rod parts one of which is screw threaded into the other and a sleeve connected to one of said rod parts via a one-way clutch and a clutch actuated by a spring the said sleeve being provided with a spirally shaped groove into which a stationary pin extends.

The invention is defined in the claims hereinafter, and how it may be performed is further described below with reference to the accompanying drawings, in which by way of example:

FIG. 4 is a view in axial section of another embodiment of a brake according to the invention; and FIG. 5 is a section along the line V-V of FIG. 4.

Figure 1:
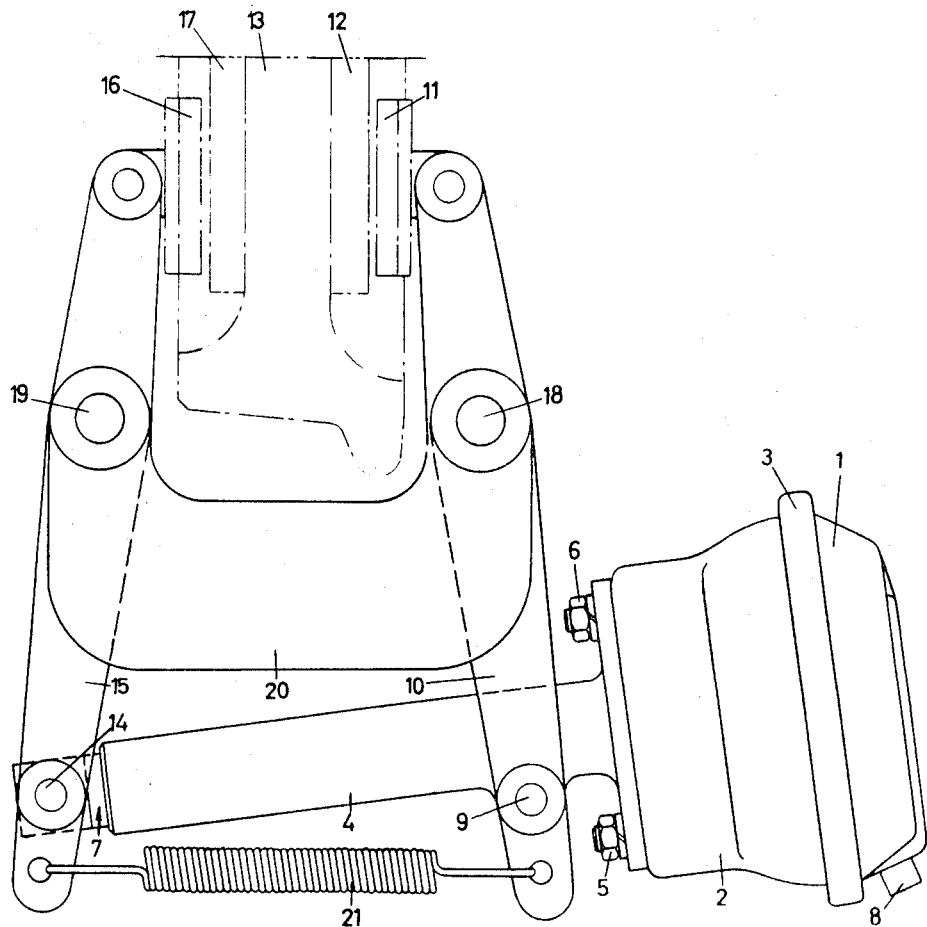
FIG. 1 is a plan view showing parts of a disc brake according to the invention.

As shown in FIG. 1 a pneumatic brake cylinder comprises two parts 1 and 2 secured to one another by a fastening band 3. A cylinder head 4 is fastened to the part 2 by bolts 5 and 6 and guides a piston rod 7. Compressed air is fed to the cylinder through a hose (not shown) attached to a union fitting 8. The cylinder head 4 is pivotally connected at 9 to a two-armed lever 10 which is pivotally connected to a brake pad 11 adapted to engage a braking disc 12 secured to one side of a railway vehicle wheel 13. The piston rod 7 is pivotally connected at 14 to a two-armed lever 15 which is pivotally connected to a brake pad 16 adapted to engage a braking disc 17 secured to the other side of the wheel 13.

The two levers 10 and 15 are pivotally connected at 18 and 19 respectively to a yoke 20 which is supported in a frame part (not shown) of the vehicle.

A return spring 21 fastened to the levers 10 and 15 tends to keep the braking pads 11 and 16 in their released brake positions.

It will be understood that upon the supply of air pressure tending to expel the piston rod 7 the two braking pads 11 and 16 will engage the discs 12 and 17 respectively and cause braking of the wheel 13. It will also be understood that eventually wear at the braking surfaces would cause such an increase of the lost motion of the piston rod that there was a decrease in braking power, However such an increase of the lost motion is avoided by the means illustrated in FIG. 2 and FIG. 3 which automatically will cause an increase in the length of the piston rod to counteract increasing wear on the braking surfaces. As will be seen from FIG. 2 and FIG. 3 the piston rod 7 comprises two telescopically displaceable rod parts 22 and 23. The part is provided with interior screw threads adapted to receive a correspondingly externally screw-threaded portion of the other rod part 23. The rod part 22 is prevented from rotating by its pivotal connection to the two-armed lever 15 (shown in FIG. 1). Both rod parts 22 and 23 are axially guided in the cylinder head 4.

A locking sleeve 24 (FIGS. 2 and 3) having an inwardly extending shoulder with a forwardly directed hollow frustoconical surface 25 is secured by screw threads on the right-hand end of the rod part 23. A friction element 26 having a rearwardly directed tapered or frustoconical surface 27 is urged into engagement with the locking sleeve 24 by a compression spring 28 acting on a rear surface of the rod part 23 and a front surface on a flange 29 of a pin 30 carrying the friction element 26. The pin 30 also carries a sleeve 31, the said friction element 26 as well as the sleeve 31 being prevented from axial movements on the pin 30 by the flange 29 and by a split locking ring 32.

The right-hand end of the pin 30 abuts a disc 33 which in turn abuts a needle bearing 34 abutting a front surface on an inwardly extending collar 35 on a sleeve 36 which is slidable in the axial direction relative to the cylinder head 4. The sleeve 36 is prevented from rotation relative to the cylinder head by a pin 37 secured to the cylinder head 4 and projecting through a longitudinally extending slot 38 in the sleeve 36. The pin 37 also extends into a groove 39 which is formed in the sleeve 31 and is of helical shape but comprises a small longitudinally extending portion at its front end (the end at which the pin 37 is located in FIG. 2 and 3). The friction element 26 and the sleeve 31 are provided with interior cylindrical surfaces concentrically mounted and of the same diameter, these cylindrical surfaces being lined with a helically tightly wound spring 40 forming a one-way clutch connection between the said friction elements and the said sleeve 31.

A sleeve 41 is threaded on the left-hand end of a pin 42 connected to a membrane (not shown) in the brake cylinder. The front end of the sleeve 41 is adapted to abut a rear surface on the collar 35 on the sleeve 36.

Figure 2:
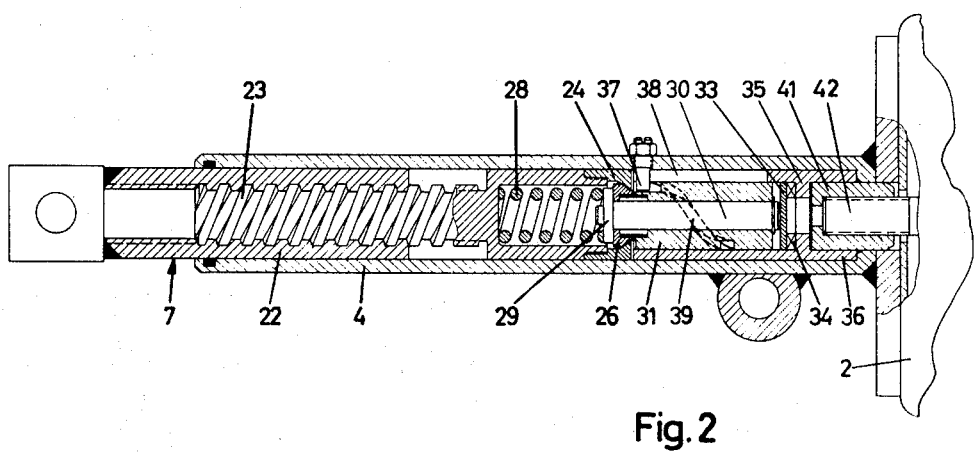
FIG. 2 is a view in axial section of the piston rod of the brake of FIG. 1.
Figure 3:
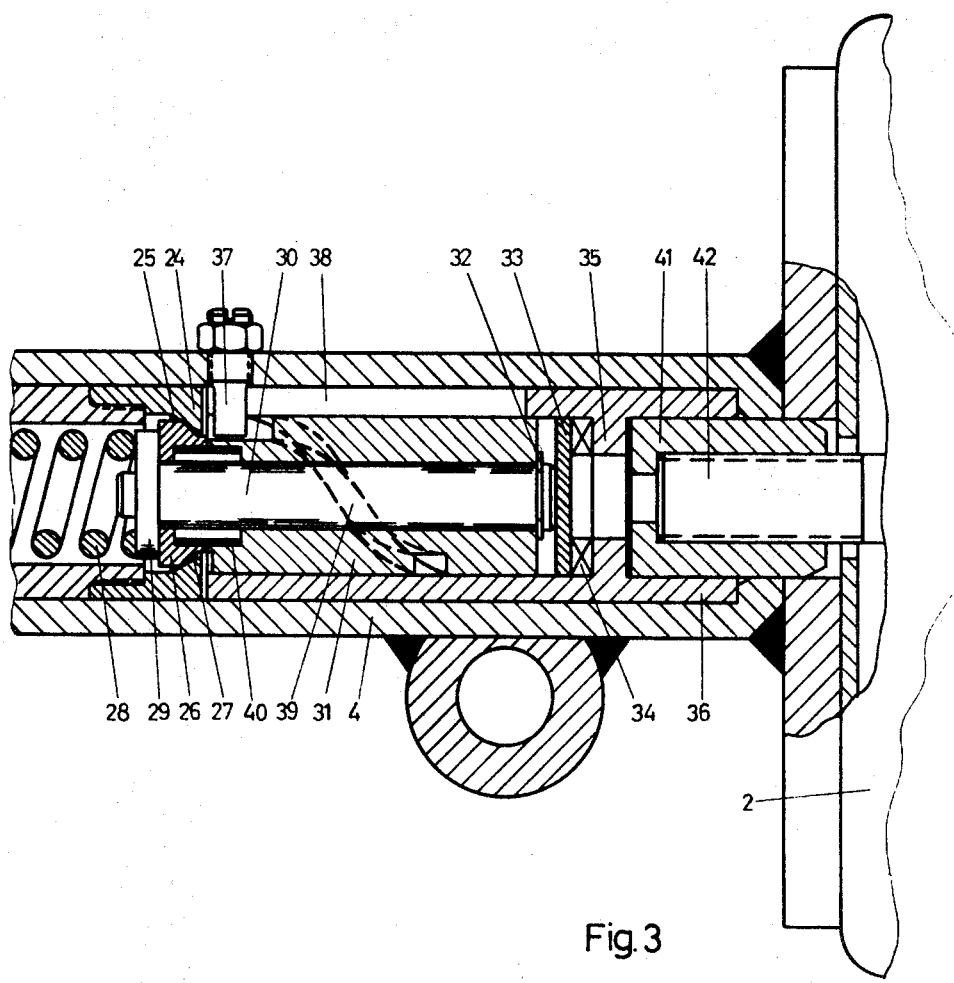
FIG. 3 is a view showing some parts as in FIG. 2 but on a larger scale.

The illustrated disc brake will operate as follows:

Upon application of the brake the pin 42 will be moved forwardly i.e. in the direction towards the left in FIG. 2 and FIG. 3. The sleeve 41 will contact the collar 35 which will transmit brake-applying force via the bearing 34, the disc 33 and the pin 30 to the flange 29. As long as the force does not exceed the force of the prestressed compression spring 28 all brake-applying force will be transmitted from the flange 29 via the spring 28 to the rod part 23 and hence to the rod part 22, levers 10 and 15, and pads 11 and 16.

However, as soon as the transmitted brake-applying force exceeds the force of the spring 28 the said spring will be compressed and the sleeve 36 will contact the locking sleeve 24. The brake-applying force exceeding the force of the spring 28 will now be transmitted directly from the sleeve 41 via the sleeve 36, the locking sleeve 24 and the rod part 23 to the rod part 22. The frustoconical surfaces 25 and 27 on the locking sleeve 24 and the friction element will now become axially spaced. All parts of the piston rod contained and guided within the cylinder head 4 will now be axially displaced towards the left-in the forward direction. During said axial displacement the pin 37 will cause a rotation of the sleeve 31 as soon as the pin 37 enters the helical portion of the groove 39. However, the rotation of the sleeve 31 will not be transmitted to the friction element 26 is any substantial resistance from the friction between the surfaces 25 and 27 is present. This is because the one-way clutch formed by the spring 40 is adapted not to transmit any torque in this direction of rotation.

During the following release of the brakes the sleeve 31 will move rearwardly i.e. towards the right relative to the cylinder head 4, and the pin 37 will cause a rotation of the sleeve 31 by its contact with the walls of the groove 39. The spring 40 will transmit the rotation to the friction element 26 even in cases where a substantial resistance against such rotation is present. However, as long as the brake-applying force transmitted is greater than the force of the spring 28 the clutch surfaces 25,27 are separated and thus no rotation will be transmitted to the locking sleeve 24.

As soon as the brake-applying force has decreased to the value of the force of the spring 28 the clutch surfaces 25, 27 will be engaged and any rotation of the sleeve 31 in the takeup direction will be transmitted to the locking sleeve 24 and thus to the rod part 23. An increase in the length of the piston rod 7 will thus be caused if during the release of the brake the transmitted brake-applying force has decreased to a value below the magnitude of the force of the spring 28 while the sleeve 31 is still being rotated–i.e. prior to the pin 37 having entered the front end portion of the groove 39 which is axially directed.

It will be understood that the slack-adjusting device will operate in a very accurate way and thus it will be possible to keep a constant and very small clearance between the braking surfaces of the respective pads 11 and 16 and the discs 12 and 17 in their released brake position.

The device shown in FIGS. 4 and 5 is similar to that of FIGS. 1, 2 and 3 in most respects. However, the device of FIG. 4 is designed so that the exterior return spring 21 shown in FIG. 1 may be dispensed with. Also the device of FIG. 4 has improvement in function and reliability.

As shown in FIG. 4 a pneumatic brake cylinder comprises two parts 51 and 52 secured to one another by a metal strip 53 passed into grooves of corresponding cross section in the two parts 51 and 52. A piston 54 is mounted slidably in the cylinder part 51 and carries a piston rod part 55. The piston rod part 55 is guided in a sleeve 56 secured to the cylinder part 52 by means of a number of bolts 57 only one of which is shown in the drawing. A piston return spring 58 acts upon the piston 54 and on the cylinder part 52.

The piston rod part 55 contains a sleeve 59 having a groove 60 which extends axially at its right-hand end and spirally at its remaining part. A pin mounted on the sleeve 56 is passed through an axially extending slot 62 in the piston rod part 55.

The sleeve 59 contains a pin 63 provided with a circumferential groove containing a circlip 64. At its left end the pin 63 carries a nut 65 which together with the circlip 64 axially guides a ball bearing 66 and a shoulder 67 on the piston rod part 55. The pin 63 is provided with a head 68 at its right end, a coupling part 69 being clamped between said head 68 and the sleeve 59. The head 68 bears against a spring 70 located in a bore in a piston rod part 71 threaded into a further, tubular shaped piston rod part 72 guided in a sleeve 73 fastened to the cylinder part 52 by means of the bolts 57. The tubular piston rod part 72 carries a sleeve 74 at its right end as well as a protective tube 75. A connecting piece 76 is secured to the tubular rod part 72 and prevented from rotations relative thereto by a manually releasable locking pin 77 as shown in FIG. 5.

The piston rod part 71 carries a toothed coupling part 78 adapted to engage the coupling part 69 as well as a coupling ring 79 rigidly secured to the sleeve 56. The coupling part 69 and the sleeve 59 are provided with adjacent cylindrical surfaces of equal diameter engaged by a tightly wound coil spring 80 serving as a one-way coupling which is able to transmit rotary movements from the sleeve 59 to the coupling part 69 in one direction only—the said direction being referred to as the slack takeup direction.

The piston rod part 71 also carries a rigidly mounted coupling part 81 which is connected to a coupling part 82 by another coiled spring 83. The coupling part 82 is prevented from rotation relative the sleeve 73 by a lug 84 on the coupling part 82 extending into a groove 85 in the sleeve 73. The coiled spring 83 will allow movements in the slack takeup direction of the piston rod part 71 relative the stationary sleeve 73.

Compressed air may be fed to the space limited by the cylinder part 51 and the piston 54 through a fitting 86. The cylinder part 52 is provided with venting openings 87 and 88.

The device described with reference to FIGS. 4 and 5 will operate as follows:

Upon passing compressed air to the space at the left side of the piston 54 the piston rod parts 55, 71 and 72 will be moved towards the right. The braking force will be transmitted initially through the following elements: piston 54, piston rod part 55, shoulder 67, circlip 64, pin 63, head 68, spring 70, piston rod part 71, piston rod part 72 and connecting piece 76 to the remaining part of the brake rigging—not shown in FIGS. 4 and 5.

As soon as the braking force exceeds the force of the spring 70 the said spring 70 will be compressed and the right-end surface of the piston rod part 55 will abut the coupling part 78. The part of the braking force exceeding the force of the spring 70 will thus be transmitted while bypassing the following elements: shoulder 67, circlip 64, pin 63, head 68 and spring 70. Upon contact between the right end of the sleeve 55 and the coupling part 78 the toothed coupling between the parts 69 and 78 will have been released.

During the movement of the sleeve 59 towards the right the pin 61 will move in the groove 60. When the pin 61 enters into the spirally part of the groove 61 the sleeve 59 will start rotating in a direction opposite to the slack takeup direction. Such direction of rotation cannot be transmitted by the one-way clutch 80 against any noticable resistance. The one-way clutch 83 prevents rotation of the piston rod part 71 in the direction opposite to the slack takeup direction and as the coupling part 78 is rigidly connected to the piston rod part 71 the coupling part 69 will not start rotating as long as it is clutchably connected to the coupling part 78 during the application of the brake.

When the piston rod parts are transmitting a substantial braking force the spring 70 is compressed and the coupling parts 69 and 78 are disengaged. During the release of the brake the transmitted brake force will decrease while the piston 54 and the elements connected thereto will move towards the left. The sleeve 59 will now be rotated in the slack takeup direction and the coupling part 69 will take part in this rotation. However, the coupling part 78 will not become clutchably connected to the coupling part 69 as long as the transmitted braking force exceeds that of the spring 70. In case of excessive slack in the brake rigging the braking force will have decreased beyond the force of the spring 70 while the pin 61 is still in the spirally shaped part of the groove 60. In such case a rotation in the slack takeup direction will be transmitted to the piston rod part 71 and as the tubular rod part 72 is prevented from rotation by its connection to the remaining part of the brake rigging an increase of the total length of the parts 71 and 72 is obtained.

It should be noted that the piston return spring 58 alone is able to release the brake as it will exert a force towards the left via piston 54, piston rod part 55, shoulder 67, ball bearing 66, nut 65, pin 63, head 68, coupling parts 69 and 78 and coupling ring 79.

The engagement between the coupling part 78 and the coupling ring 79 will prevent any undesired adjustment movements when the brake is released.

A manual adjustment may be carried out by pulling the locking pin 77 and rotating the protective tube 75 and thus the tubular piston rod part 72.

What we claim is:

1. A railway vehicle brake of the kind actuated by a longitudinally moving piston unit applying braking forces, comprising in combination, a piston rod having two telescopically displaceable rod parts, a first of which is screw-threaded into a second, a sleeve with a spirally shaped groove, a one way clutch connecting said sleeve to one of said rod parts, a stationary pin extending into said spiral groove, a spring coupled between said sleeve and said piston rod to transmit braking forces, a second clutch biased by said spring in a locking position coupled between said sleeve and said piston rod, and means imparting linear motion to said sleeve tending to rotate the spiral groove about said stationary pin in response to braking forces when said spring bias is overcome by the braking forces.

2. A railway vehicle brake as defined in claim 1 including means causing said one way clutch to transmit motion from said sleeve to telescopically displace said rod parts upon release of the braking forces, when said second clutch is in a locking position.

3. A railway vehicle brake as defined in claim 1 including means fixing one of said rod parts against rotation.

4. A brake as defined in claim 1 including a pin carrying said sleeve and extending therethrough between said spring and said moving piston unit.

5. A brake as defined in claim 1 with disc brakes operable on opposite sides of a railway wheel including a piston head and a movable piston rod extending from said head, and levers coupled respectively from said piston head and said piston rod to actuate said disc brakes.

6. A brake as defined in claim 5 including a yoke in which each of said levers is pivoted, and a spring member coupled between said levers tending to release said disc brakes from contact with said wheel.

7. A brake as defined in claim 5 including a braking piston with the piston biased for return by a spring.

8. A brake as defined in claim 1 including means for manually telescoping said displaceable rod parts.

9. A brake as defined in claim 1 including two spaced members between said piston unit and said piston rod adapted to transmit linear braking forces when said spring is compressed.

10. A brake unit as defined in claim 1 including means to rotate said spiral groove in said sleeve freely about said stationary pin from a rest position when braking forces above a threshold level are applied and to telescope said rod parts by return of said sleeve to said rest position upon release of the braking forces to thereby take up slack in the brake rigging.